United States Patent [19]

Turbett

[11] 4,044,200

[45] Aug. 23, 1977

[54] INSULATED WIRE OR CABLE

[75] Inventor: Robert J. Turbett, Millington, N.J.

[73] Assignee: Union Carbide Corporation, New York, N.Y.

[21] Appl. No.: 451,113

[22] Filed: Mar. 14, 1974

Related U.S. Application Data

[62] Division of Ser. No. 312,134, Dec. 4, 1972, abandoned.

[51] Int. Cl.$^2$ .............................................. H01B 7/28
[52] U.S. Cl. ........................ 174/23 R; 174/110 PM; 260/45.8 NT
[58] Field of Search ............ 174/23 R, 23 C, 110 PM, 174/110.5 R; 260/45.9 NC, 45.8 NT

[56] References Cited

U.S. PATENT DOCUMENTS

| | | | |
|---|---|---|---|
| 3,153,048 | 10/1964 | Thatcher | 260/45.8 NT |
| 3,267,113 | 8/1966 | Carboni | 260/45.8 NT |
| 3,337,356 | 5/1966 | Carboni | 260/45.8 NT |
| 3,585,165 | 6/1971 | Gerlach et al. | 260/45.8 NT |
| 3,594,448 | 7/1971 | Birenzuige et al. | 260/45.8 NT |
| 3,642,813 | 2/1972 | Kirchmayr et al. | 260/45.8 NT |
| 3,668,298 | 6/1972 | Hawkins | 174/23 C |
| 3,721,645 | 3/1973 | Zemlin | 260/45.8 NT |
| 3,755,610 | 8/1973 | McTigue | 174/23 C |
| 3,772,245 | 11/1973 | Dexter | 260/45.9 NC |
| 3,790,517 | 2/1974 | Koizumi | 260/45.9 NC |

*Primary Examiner*—Arthur T. Grimley
*Attorney, Agent, or Firm*—James J. O'Connell

[57] ABSTRACT

Insulated wire or cable having primary insulation between copper conductor and moisture barrier filler and wherein the primary insulation comprises ethylene polymer having a density of about 0.928 to 0.955, copper deactivating amounts of at least one organic compound which is an alkyl hydroxy phenyl alkanoyl hydrazide, and/or a substituted amido triazole, and antioxidant effective quantities of at least one organic compound having a molecular weight of $\geq$ 550 and which contains $\geq$ four hindered phenolic groups per molecule thereof.

4 Claims, No Drawings

INSULATED WIRE OR CABLE

This is a division of application Ser. No. 312,134 filed Dec. 4, 1972, now abandoned.

BACKGROUND OF THE INVENTION

1. Field of the Invention

This invention relates to ethylene polymer based compositions which are useful as primary insulation for copper conductors which are used in wire and cable which contain waterproofing filler and which can be used under elevated temperature conditions.

2. Description of the Prior Art

The current trend in the installation of telephone wire and cable which contains copper conductors is to install the wire or cable underground, in a duct, or by direct burial. To protect the wire or cable from water damage under such conditions, it is filled with waterproofing fillers. Filled cables of this type are disclosed in U.S. Pat. No. 3,668,298. The use of the waterproofing fillers in such cables, however, presents compatability problems with respect to the polyolefin resin based compositions which have been used to date as the primary insulation for such wire and cable, and which primary insulation comes into contact with the filler during the use of the wire and cable. If the polyolefin resin and the filler are too compatible the resin will absorb the filler and swell and possibly also leach out from the insulation, stabilizers and other components of the insulation composition.

The selection of suitable synthetic resins for use as primary insulation in the filled wire or cable is further complicated by the fact that the resin based composition which must be used in this regard must be stable with the filler at elevated temperatures of the order of about 40° to 70° C. for extended periods of time, and the resin must also be stable during extrusion thereof around the individual copper conductors at elevated temperatures of the order of about 200° to 300° C.

Although the filled wire or cable is installed underground where temperatures rarely reach a level which is likely to significantly hasten the degradation of the insulation, there are portions of the wire or cable which will experience a more hostile environment. This occurs when splices or tie-ins are made aboveground and the filler is removed from around a section of the conductor, and the insulated conductors are then left exposed to the air. The exposed conductors are usually left in an enclosed box or pedestal in which temperatures approaching 70° C may be reached in the field. The aging of the insulation in this environment represents the most crucial test of insulation stability.

The extrusion of the primary insulation, and the use of the extruded insulation, under significantly different environmental conditions than those previously encountered also requires the use of antioxidants which will be effective under such conditions for the protection of the insulation against oxidative degradation. The antioxidants to be used, however, must also be chemically and physically compatible with the filler, and the other components of the insulation composition, and the copper conductor itself.

Thus, the other components of the insulation compositions must also include copper deactivators to counteract the tendency of the copper conductor to catalytically influence the oxidative degradation of the synthetic resin in the primary insulation and any absorbed filler.

Thus, the formulation of a primary insulation composition which will be useful in contact with copper conductors and waterproofing fillers under elevated use temperatures, and after being subjected to elevated extrusion temperatures, requires the use of a unique combination of materials, which combinations are not readily achieved.

Test Procedures

To closely simulate actual extrusion and use conditions and thus facilitate the development of useful primary insulation compositions, several test procedures were devised for the purposes of evaluating candidate insulation compositions.

Preparation of Candidate Insulation Compositions

The candidate insulation compositions were prepared by milling together, on a two-roll mill or in a Brabender mixer or in a Banbury mixer at a temperature of about 150° to 180° C., the components of each candidate composition, which usually comprised, in % by weight, 98.8% of candidate synthetic resin
1% of $TiO_2$ (to simulate pigment effect)
0.1% of candidate antioxidant
0.1% of candidate copper deactivator The resulting compositions were then tested as 0.010 inch thick films, and/or after being extruded onto copper wire.

Testing of Candidate Insulation Compositions as Film

When the candidate composition was tested as a film it was first immersed in a waterproofing filler for 7 days at 70° C. with one side of the film held in contact with a copper foil during this aging period. This test procedure is used because it simulates the environmental history of a portion of the insulation in a wire or cable which has experienced typical handling, including storage on reels in sunlight, removal of filler for splicing operations and then permanent installation in splice boxes or pedestals above ground wherein temperatures may approach 70° C.

The waterproofing filler used in all of these test procedures was a stabilized mixture of petroleum jelly and a homopolymer of ethylene.

The films were then wiped free of the waterproofing filler and were then further tested by heat aging them in air at 120° C. in a circulating air oven while in contact, in the oven, with copper foil. The time to brittleness was then recorded. Brittleness was determined by removing the film from the oven once every 24 hours, allowing it to reach room temperature and flexing it. Brittleness was reached when the insulation first showed cracking. The films were returned to the oven, in contact with the copper foil, between flexing tests.

The standard insulation composition against which the candidate compositions were tested was a composition consisting of, in % by weight, 98.9% of the candidate synthetic resin
1.0% of $TiO_2$
0.1% of 4.4'-thiobis-(3-methyl-6-t-butyl phenol) (as antioxidant)

This standard insulation composition, when tested as a film or as wire insulation as disclosed below, has an expected lifetime (L) at 43° C (simulated pedestal temperature) of $L_{43}$ = 100 years. This lifetime is arrived at from Arrhenius plots of temperature and lifetime at several temperatures. From these plots it is then possible to calculate a predicted lifetime (in years) at 43° C from a single measurement of actual lifetime (in days) at 120° C in an oven aging test as described below. This relationship is $$L_{43} \text{ (years)} = 12.25 \, L_{120} \text{ (days)}$$

The standard insulation composition's lifetime is $L_{120}$ = 8 days or $L_{43}$ = 100 years.

Testing of Candidate Insulation Composition on Wire

When the candidate composition was tested after being extruded onto copper wire, the composition was extruded onto a 19, 22 or 24 AWG single copper wire at an extrusion speed of about 2000 feet per minute while the composition was heated to a temperature of about 260° to 290° C. The candidate compositions were extruded onto the wire so as to provide insulation coatings which were about 8 to 11 mils thick, depending on wire size.

A length of the insulated wire was then immersed in the waterproofing filler for 7 days at 70° C.

The test wire was then removed from the filler, wiped free of the filler and then further tested by heat aging it in air at 70°-160° C. in a circulating hot air oven. At temperatures of 70°-120° C i.e., below the melting point of the polymer, the wire was aged in the form of "pigtail" specimens in which the wire was wrapped in a tight coil about its own diameter. At temperatures of > 120° C straight lengths of wire were aged. The time to brittleness of the insulation was then recorded. Brittleness was determined by removing the wire from the oven at various intervals depending on the test temperature, and allowing it to reach room temperature and by examining it for spontaneous cracking in the pigtail specimens or upon flexing the other samples. Brittleness was reached when the insulation first showed cracking. The wires were returned to the oven, between observations.

Summary of the Invention

An object of the present invention is to provide primary insulation compositions for copper conductors which are to be used in electrical wire and cable which is to be filled with waterproofing filler.

Another object of the present invention is to provide such insulation compositions as will be useful for prolonged periods of time at elevated temperatures.

A further object of the present invention is to provide such insulation compositions as can be useful after being extruded onto the copper conductors under high temperature extrusion conditions.

It has now been discovered that, and in accordance with the present invention, these and other objects are achieved by using as the insulation composition one which comprises a selective combination of certain ethylene polymer as a base resin, certain nitrogen-containing compounds as copper deactivating agents and certain high molecular weight organic compounds as antioxidants.

DESCRIPTION OF THE PREFERRED EMBODIMENT

It has now been found that the objects of the present invention can be realized by using as a primary insulation composition for copper conductors which are to be used in electrical wire and cable which is to be filled with waterproofing filler and subjected to use temperatures of about 40° to 70° C. one which comprises ethylene polymer having a density of about 0.928 to 0.955, copper deactivating amount of at least one organic compound which is an alkyl hydroxy phenyl alkanoyl hydrazide and/or a substituted amido triazole, and antioxidant effective quantites of at least one organic compound having a molecular weight of $\geq$ 550, and which contains at least four hindered phenolic groups per molecular.

Ethylene Polymer

The ethylene polymer which is to be used as the base resin in the insulation compositions of the present invention is a solid (at 25° C.) thermoplastic resin having a density of about 0.928 to 0.955 gr/cc (ASTM-1505 test procedure with conditioning as in ASTMD-1248-72). The composition will contain about 95 to 99.8% by weight of such ethylene polymer, based on the total weight of the composition.

The ethylene polymer component of the insulation composition of the present invention is comprised of one or more thermoplastic homopolymers or copolymers of ethylene which may be a homopolymer of ethylene having a density of about 0.918 – 0.940, and/or a copolymer of ethylene having a density of about 0.928 – 0.955.

The ethylene copolymers to be used in the compositions of the present invention are those of ethylene and one or more other linear $C_3$ to $C_6$ alpha olefins. The other alpha mono-olefins would thus be propylene, butene-1, pentene-1, and hexene-1.

The copolymers will contain at least about 90% by weight of polymerized ethylene. The desired density range of the copolymers will dictate the exact amount of the other comonomer(s) which is to be used.

The ethylene polymer must also be readily extrudable, i.e. it must have a melt index of about 0.1 to 2 decigrams/minute (ASTM D-1238 at 44 psi test pressure).

Copper Deactivator

The insulation compositions of the present invention also contain copper deactivating amounts of one or more of the copper deactivating compounds described below. These copper deactivating amounts are usually of the order of about 0.05 to 0.2% by weight, based on the total weight of the insulation composition.

The copper deactivating agents to be used in the insulation compositions of the present invention are organic nitrogen containing compounds, and are one or more of I an alkyl hydroxy phenyl alkanoyl hydrazine, and/or
II a substituted amido triazole.

The I copper deactivators, which are disclosed in U.S. Pat. No. 3,660,438, have the structure

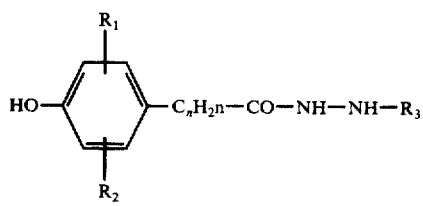

wherein $R_1$ and $R_2$ are the same or different $C_1$ to $C_6$ inclusive, alkyl radicals, $R_3$ is H or a $C_2$ to $C_{18}$, inclusive, alkanoyl radical or a group having the structure

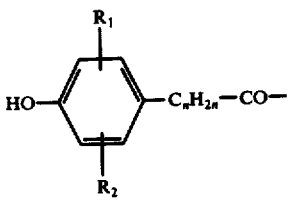

wherein $R_1$ and $R_2$ are as disclosed above, and $n$ is an integer of O to 5, inclusive.

These I copper deactivators include P0 N,N'-bis-β-(3,5-di-t-butyl-4-hydroxy phenyl)-propionyl-hydrazine, N-stearyl-N' [β(3,5-di-t-butyl-4-hydroxyl phenyl) propionyl]hydrazine,
N-[β-(3 ethyl-5-t butyl-4 -hydroxy phenyl)-propionyl]- N'β-(3,5-di-t-butyl-4-hydroxy phenyl)-propionyl hydrazine
N-[β(3.5-di-t-butyl-4-hydroxyphenyl) propionyl]-N'-(3.5-di-t-butyl-4-hydroxybenzoyl)-hydrazine
β-(3,5-diisopropyl-4-hydroxy phenyl)-propionyl-hydrazine N-stearoyl-N'-[β-(3,5-diisopropyl-4-hydroxyphenol)-N-stearoyl-N'
[B-(3,5-diisopropyl-4-hydroxyphenol)--propionyl]-hydrazine
β-(3methyl-5-t-hexyl-4-hydroxy phenyl)-propionyl-hydrazine
N'octanoyl-N-[β-(3-methyl-5-t-hexyl-4-hydroxyphenyl)--propionyl]-hydrazine
β-(3,5-di-t-butyl-4-hydroxyphenyl) propionyl-hydrazide.

The II copper deactivators, which are disclosed in German Patent (application) 2,164,234 have the structure

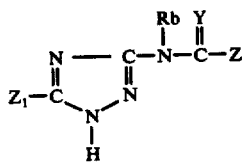

wherein Rb is H or $C_1$ to $C_4$, inclusive, alkyl, $Z_1$ is H or $C_1$ to $C_{18}$, inclusive alkyl, $C_6$ to $C_{18}$, inclusive, aryl or alkaryl, $C_2$ to $C_{18}$, inclusive alkylene alkoxy or alkylene aryloxy, heterocyclic rings with 4 or 5 carbon atoms and 1 or 2 nitrogen atoms in the ring, or the residue of formula

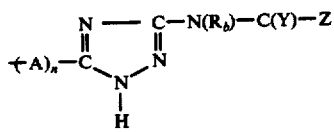

wherein
$n = 0$ or 1 and A is a $C_1$ to $C_{18}$, inclusive, alkylene group;
Y is O or S;
Z is a benzene or naphthalene ring substituted with 1 or 2 $R_c$ groups and 0 to 2 $R_d$ groups, with $R_c$ being —OH, —SH, —$SR_d$ or a group of the formula

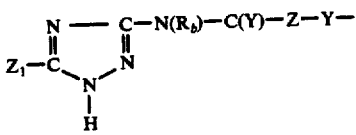

with at least one $R_c$ being in the o-position, and $R_d$ being a $C_1$ to $C_{18}$ alkyl, phenyl, alkylphenyl, alkoxy, acyl, acyloxy, phenoxy or alkylphenoxy, halogen or amino group.

There is a maximum of two 1,2,4-triazole groups per molecule in the II copper deactivators. The preferred II copper deactivators are 3-salicyloyl-amido-1,2,4-triazole, 3-benzo-salicyloyl-amido-1,2,4-triazole and 3-thiosalicyloyl-amido-1,2,4 triazole.

Antioxidant

The insulation compositions of the present invention also contain antioxidant effective quantities of one or more of the antioxidant compounds described below. These antioxidant effective quantities are usually of the order of about 0.01 to 0.2% by weight, based on the total weight of the insulation composition.

The antioxidant compounds to be used in the insulation composition of the present invention are organic compounds which are other than the copper deactivators and have molecular weights of at least 550 and are one or more
compounds comprising at least four hindered phenolic hydroxyl groups. The phenolic hydroxyl groups are preferably hindered, partially or completely, with tertiary butyl groups. 4' -hydroxy phenyl)-propionate]methane.

The antioxidant and copper deactivator are also preferably used in a weight ratio, to each other, of about 1 to 2.

Adjuvants

The insulation compositions of the present invention may also contain, in effective quantities thereof, one or more adjuvant materials which are commonly employed in primary insulation compositions intended for use in contact with copper conductors and waterproofing filler. Such adjuvants would include color pigments such as titanium dioxide and carbon black.

The total amount of such adjuvants which are used usually amounts to no more than about 0.5 to 2% by weight, based on the total weight of the insulation composition.

The insulation compositions of the present invention may also be used in cellular form. To prepare the cellular compositions blowing agent effective quantities of conventional blowing agents which are chemically compatible with antioxidant and the copper deactivating agents are admixed with the insulation composition and the resulting composition is then blown, by conventional blowing techniques, as the insulation is applied to the copper wire substrate.

Waterproofing Filler

The waterproofing filler with which the primary insulating compositions of the present invention are used are hydrophophic, hydrocarbon, moisture-barrier materials. They are usually waxy or jelly like materials which are soft solids at 25° C and have melting points of about 50° to 80° C. These waterproofing fillers include petrolatums which are petroleum distillate residues, low molecular weight polyolefin resins, and mixtures thereof.

The following examples are merely illustrative of the present invention and are not intended as a limitation upon the scope thereof.

EXAMPLES 1–4

For these examples various combinations of the copper deactivators and antioxidants of the present invention were blended together as described above with one part by weight, based on the weight of the total composition, of $TiO_2$ and about 98.8 parts by weight, based on the weight of the total composition of a solid copolymer of ethylene and butene-1 having a density of 0.950.

The resulting primary insulation compositions were tested as film (aging test procedure A) or as extruded on wire (aging test procedure B) as described above, and in contact with a waterproofing filler. This filler was a blend of 92% by weight of petroleum jelly and 8% by weight of low density polyethylene (0.927). The 92/8 blend had a melting point of water of about 70° C and was stabilized with 0.5% by weight of tetrakis [methylene-3,3′, 5-di-t-butyl-4′-hydroxyphenyl-propionate]methane.

The following Table lists the specific copper deactivators and antioxidants, as well as the amounts thereof in % by weight, based on the total weight of the composition, which were used in each composition. The Table also lists the test procedure (A or B) used with each composition. Finally the Table lists the $L_{120}$ lifetime, in days, of each of these compositions. These $L_{120}$ lifetimes show that the stabilized compositions of the present invention provide extremely good insulation for prolonged use under elevated temperature conditions.

TABLE

| Ex. | Cu. De-act.** | Amt. of Cu. Deact. % | Anti-Oxi-dant** | Amt. of Antiox % | Filler Blend | $L_{120}$, days | Aging Test |
|---|---|---|---|---|---|---|---|
| 1. | CD-1 | 0.1 | AO-1 | 0.1 | 92/8 | 28 | B |
| 2. | CD-2 | 0.2 | AO-1 | 0.1 | 92/8 | 11 | A |
| 3. | CD-2 | 0.2 | AO-1 | 0.1 | 92/8 | 11–13 | B |
| 4. | CD-3 | 0.1 | AO-1 | 0.1 | 92/8 | 17 | A |

**as used in the Table

AO-1 is tetrakis [methylene-3,3′,5-di-t-butyl-4′-hydroxyphenyl propionate]methane.

CD-1 is N,N′-bis-β-(3,5-di-t-butyl-4-hydroxy phenyl)-propionyl-hydrazine.

CD-2 is a substituted amido triazole which is provided by Argus Chemical Corp., Brooklyn, New York, U.S.A., as Mark 1475 (T.M) and which has a melting point of 302° C and a molecular weight of about 200 and is believed to be 3-salicyloyl-amido-1,2,4-triazole.

CD-3 is a substituted amido triazole which is provided by Argus Chemical Corporation, Brooklyn, New York, U.S.A., as Mark 1475-A (T.M.) and which has a melting point of about 230° C and is believed to be a modification of CD-2 wherein $Z_1$, as shown in the structure above, is an alkyl group.

What is claimed is:

1. Insulated wire or cable having primary insulation between copper conductor and moisture barrier filler and wherein said primary insulation comprises, based on the total weight of said insulation.
   a. solid ethylene polymer having a density of about 0.928 to 0.955,
   b. about 0.05 to 0.2% by weight of 3-salicyloyl-amido-1,2,4-triazole, and
   c. about 0.01 to 0.2% by weight of at least one organic compound having a molecular weight of at $\geq 550$, and which is selected from the group consisting of compounds containing at least four hindered phenolic hydroxyl groups.

2. Insulated wire or cable as in claim 1 in which said (c) organic compound is tetrakis[methylene-3-(3′,5′-di-t-butyl-4′-hydroxy phenyl)-propionate]methane.

3. Insulated wire or cable as in claim 1 in which said ethylene polymer comprises ethylene homopolymer having a density of about 0.918 – 0.940.

4. Insulated wire or cable as in claim 1 in which said ethylene polymer comprises ethylene copolymer having a density of about 0.928 – 0.955.

* * * * *